(12) United States Patent
Shabi et al.

(10) Patent No.: US 11,226,740 B2
(45) Date of Patent: Jan. 18, 2022

(54) SELECTIVELY PERFORMING INLINE COMPRESSION BASED ON DATA ENTROPY

(71) Applicant: EMC IP Holding Company LLC, Hopkinton, MA (US)

(72) Inventors: Uri Shabi, Tel Mond (IL); Alexei Kabishcer, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/669,160

(22) Filed: Oct. 30, 2019

(65) Prior Publication Data

US 2021/0132813 A1 May 6, 2021

(51) Int. Cl.
   *G06F 3/06* (2006.01)
   *G06F 9/30* (2018.01)

(52) U.S. Cl.
   CPC .......... *G06F 3/0608* (2013.01); *G06F 3/064* (2013.01); *G06F 3/0659* (2013.01); *G06F 3/0673* (2013.01); *G06F 9/30043* (2013.01); *G06F 9/30079* (2013.01)

(58) Field of Classification Search
   CPC ...... G06F 3/0608; G06F 3/064; G06F 3/0659; G06F 3/0673; G06F 9/30043; G06F 9/30079

USPC ........................................................ 711/154
   See application file for complete search history.

(56) References Cited

U.S. PATENT DOCUMENTS

| | | | |
|---|---|---|---|
| 9,531,403 B2 | 12/2016 | Kruus et al. | |
| 10,409,496 B1 | 9/2019 | Si et al. | |
| 10,452,616 B1* | 10/2019 | Bassov | G06F 3/067 |
| 10,503,516 B1* | 12/2019 | Faibish | G06F 3/0688 |
| 10,585,604 B2 | 3/2020 | Bassov | |
| 2012/0131266 A1* | 5/2012 | Cho | G06F 12/04 711/103 |
| 2014/0244604 A1* | 8/2014 | Oltean | H03M 7/30 707/693 |
| 2014/0351229 A1* | 11/2014 | Gupta | G06F 16/1744 707/693 |
| 2016/0007046 A1* | 1/2016 | Chou | H04N 19/149 375/240.02 |
| 2020/0134047 A1* | 4/2020 | Bassov | G06F 16/1744 |
| 2020/0304146 A1* | 9/2020 | Stenstrom | H03M 7/4093 |
| 2020/0341667 A1* | 10/2020 | Bassov | G06F 3/0641 |

\* cited by examiner

*Primary Examiner* — Christopher B Shin
(74) *Attorney, Agent, or Firm* — BainwoodHuang

(57) ABSTRACT

A technique for managing data storage obtains a batch of chunks of data. The technique generates, using multiple pipelined instructions operating on the batch, a measure of data entropy for each of the chunks in the batch. The technique selectively compresses chunks in the batch based at least in part on the measures of data entropy generated for the respective chunks.

22 Claims, 6 Drawing Sheets

SELECTIVELY PERFORMING INLINE COMPRESSION BASED ON DATA ENTROPY

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems support data compression for promoting storage efficiency. Compression works by reducing the size of data sets so that they consume less storage space on disk. Compression may be performed in the background or in line with storage requests.

SUMMARY

Data compression promotes storage efficiency by substantially reducing the sizes of data blocks. Such compression can be computationally expensive, however, and sometimes is not worthwhile. For example, some data may be uncompressible, or only minimally compressible, such that the computational cost of performing compression is not worth the benefit.

Data entropy provides a measure of information content within a block, and can therefore be used to predict how much data reduction could be expected if the block were compressed. In general, the higher the entropy of a block, the lower its redundancy and the less compressible the block will be. Although computing the entropy of a block is generally less computationally burdensome than compressing the same block, conventional entropy calculations are computationally expensive nevertheless and generally are unsuitable for real-time processing. It would be desirable to generate entropy values for data blocks in line with write requests, such that decisions could be made on-the-fly as to whether to attempt compression of the blocks. What is needed, therefore, is an efficient approach for generating entropy of data blocks in line with write requests.

In contrast with prior approaches, an improved technique selectively compresses arriving chunks of data based on a measure of the entropy generated using a set of pipelined instructions. The pipelined instructions accumulate values, which the improved technique combines to produce measures of entropy. Such measures of entropy inform a storage system as to whether to attempt compression on the data chunks. Advantageously, the improved technique operates quickly and efficiently, enabling the storage system selectively to compress low-entropy chunks while avoiding attempts to compress high-entropy chunks, for which compression may not be worthwhile. The storage system is thus able to use data entropy as a basis for steering in-line processing of writes, achieving both efficient data processing and optimal data reduction.

Certain embodiments are directed to a method of managing data storage in a computerized system. The method includes obtaining a batch of chunks that includes a plurality of chunks of data. The method further includes generating, using multiple pipelined instructions operating on the batch, a measure of data entropy for each of the plurality of chunks in the batch. The method further includes selectively compressing chunks of the plurality of chunks based at least in part on the measures of data entropy generated for the respective chunks.

Other embodiments are directed to a computerized system constructed and arranged to perform a method of managing data storage, such as the method described above. Still other embodiments are directed to a computer program product. The computer program product stores instructions which, when executed by control circuitry of a computerized system, cause the computerized system to perform a method of managing data storage, such as the method described above.

In some examples, the pipelined instructions operating on the batch are executed by a single CPU (central processing unit). In some examples, the chunks within the batch are of equal size. In some examples, the pipelined instructions include load instructions for loading respective data elements from a cache. In some examples, a number of the plurality of chunks is at least as great as a number of clock cycles required for the CPU to load each data element from the cache.

Some examples include executing the load instructions sequentially during respective clock cycles of the CPU. In some examples, the data elements represent counts of symbols occurring in the chunks. In some examples, the data elements include a plurality of data elements for each chunk. In some examples, the plurality of data elements for each chunk includes a data element for each symbol allowed to occur in the chunk.

In some examples, each of the data elements has a respective address location in the cache which is not shared with any other of the data elements. Some examples include providing a look up table (LUT) that associates (i) counts of symbol occurrences with (ii) entropy components corresponding to the respective counts. In some examples, the entropy components in the LUT are integer values.

In some examples, generating the measure of data entropy for a chunk includes (i) obtaining a set of entropy components from the LUT based on counts of symbols appearing in the chunk and (ii) generating a sum of the obtained entropy components. In some examples, generating the sum of entropy components includes adding entropy components across all unique symbols in the chunk. In some examples, generating the sum of entropy components includes adding entropy components across fewer than all unique symbols in the chunk.

In some examples, the symbols have a numerical sequence. In such examples, adding entropy components across fewer than all unique symbols in the chunk includes adding entropy components from every Nth symbol in the sequence, where N is an integer greater than one, and excluding from the sum other symbols in the sequence.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of managing data storage selectively compresses chunks of data based on measures of data entropy generated using a set of pipelined instructions. The pipelined instructions accumulate values, which are combined to produce measures of entropy. Such measures of entropy inform a storage system as to whether to attempt compression on the data chunks. The storage system is thus enabled to use entropy as a basis for steering in-line processing of writes, achieving both efficient data processing and optimal data reduction.

Figure 1:
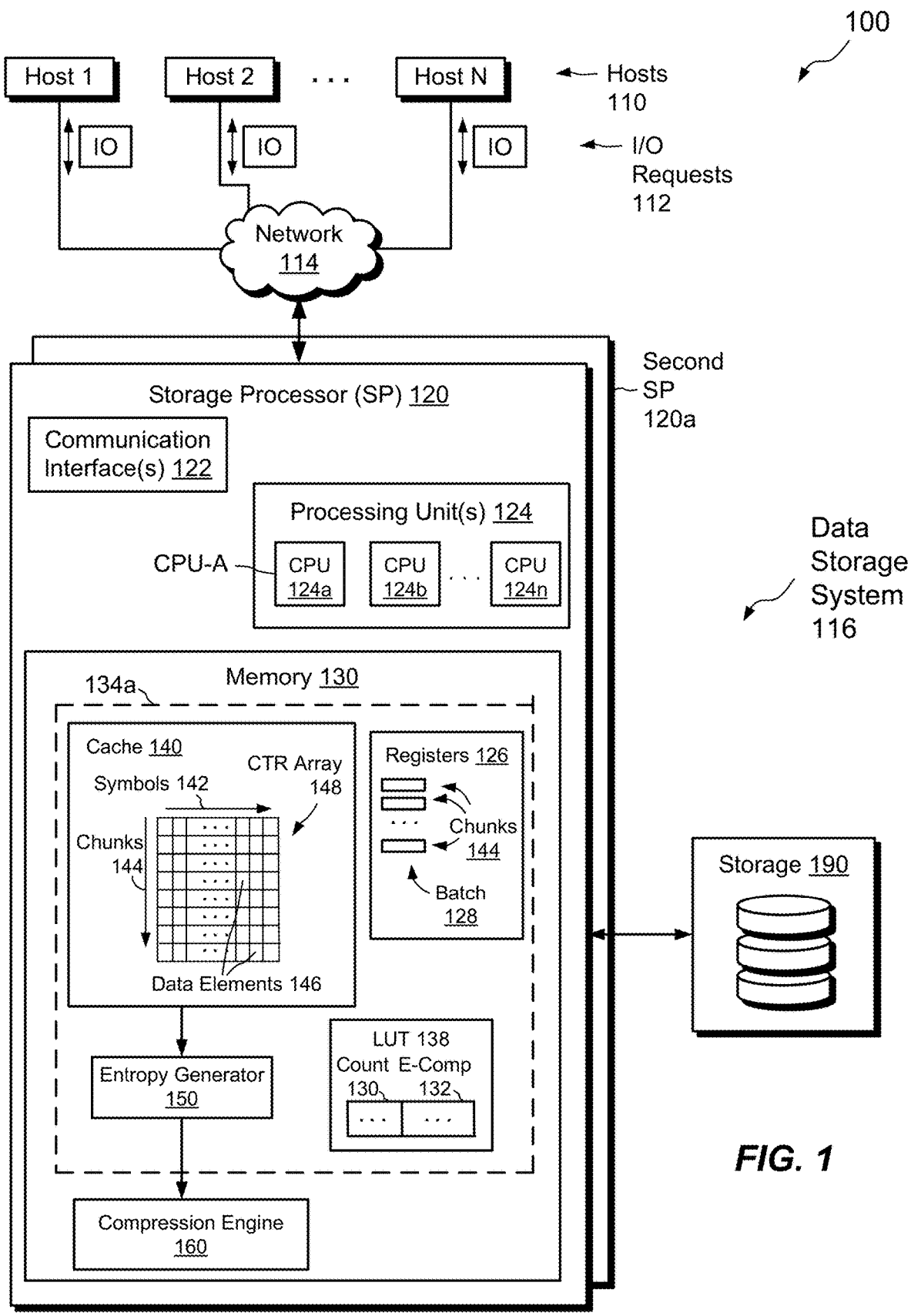
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host 110's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as multi-core CPUs (central processing units, with CPUs $124a$-$124n$ particularly shown). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

Memory 130 is further seen to include a memory portion $134a$, which depicts memory that is local to CPU $124a$ (CPU-A). Memory $134a$ may include a cache 140, such as an L0 cache, L1 cache, or other cache known to one skilled in the art. The cache 140 may be located within the CPU $124a$, in a socket in which the CPU $124a$ is inserted, or elsewhere. The cache 140 is configured to store a CTR (counter) array 148 having data elements 146. Each data element 146 is configured to store a number of occurrences of a particular symbol 142 within a particular chunk 144. In an example, a chunk 144 corresponds to a block of data within the data storage system 116.

The memory $134a$ further includes a look up table (LUT) 138 and registers 126. The LUT 138 associates counts 130 of occurrences of unique symbols 142 to respective entropy components 132, which have been pre-calculated. The LUT 138 and registers 126 may alternatively be located elsewhere in memory 130. The registers 126 store a batch 128 of chunks 144, e.g., with each register storing a respective chunk. Chunks 144 may correspond to newly arriving data, e.g., data written by hosts 110. The batch 128 of chunks 144 may comprise N chunks, where N is a positive integer greater than one, such as 8, for example. According to some examples, all chunks 144 of the batch 128 have equal size.

According to some examples, CPU $124a$ is configured to generate measures of data entropy for all chunks 144 in the batch 128. Different CPUs may operate on different batches 128. For example, multiple CPUs may operate on respective batches 128 in parallel.

As further shown in FIG. 1, the memory 130 "includes," i.e., realizes by execution of software instructions, an entropy generator 150 and compression engine 160. The entropy generator 150 is configured to generate measures of entropy for chunks 144 on a per-batch basis. The compression engine 160 is configured to compress chunks 144.

Preferably, the entropy generator 150 runs within the memory 134a of CPU 124a, for enabling fast access to the CTR array 148. One should appreciate that different instances of the entropy generator 150 may be operated simultaneously, e.g., in memories of respective CPUs.

In example operation, the hosts 110 issue IO requests 112 to the data storage system 116. The SP 120 receives the IO requests 112 at the communication interfaces 122 and initiates further processing. For example, storage processor (SP) 120 receives write requests and arranges newly arriving data in chunks 144, such as blocks. SP 120 further arranges the chunks 144 into batches 128, where each batch 128 includes N chunks 144 (e.g., N=8). The entropy generator 150 acquires a batch 128 of chunks 144 and proceeds to generate measures of entropy for each chunk 144 in the batch.

To generate a measure of entropy for each chunk 144, the entropy generator 150 iterates over each allowed symbol 142 (e.g., each unique ASCII code, byte value, or the like) and counts a number of occurrences of that symbol 142 in the chunk 144. The entropy generator 150 then obtains, for each resulting count, an entropy component 132 from the LUT 138 and sums the entropy components 138 across all counts to provide the measure of entropy for the chunk 144. The entropy generator 150 then selectively passes chunks 144 to the compression engine 160 based upon the respective levels of entropy measured. For instance, the entropy generator 150 compares the measure of entropy for each chunk 144 to a threshold. If the measure of entropy for a chunk 144 is less than the threshold, the entropy generator 150 passes that chunk 144 to the compression engine 160, to compress the chunk 144 prior to persistently storing the chunk in storage 190. But if the measure of entropy for the chunk 144 is greater than the threshold, the entropy generator 150 bypasses the compression engine 160 and the chunk 144 is stored in uncompressed form.

Figure 2:
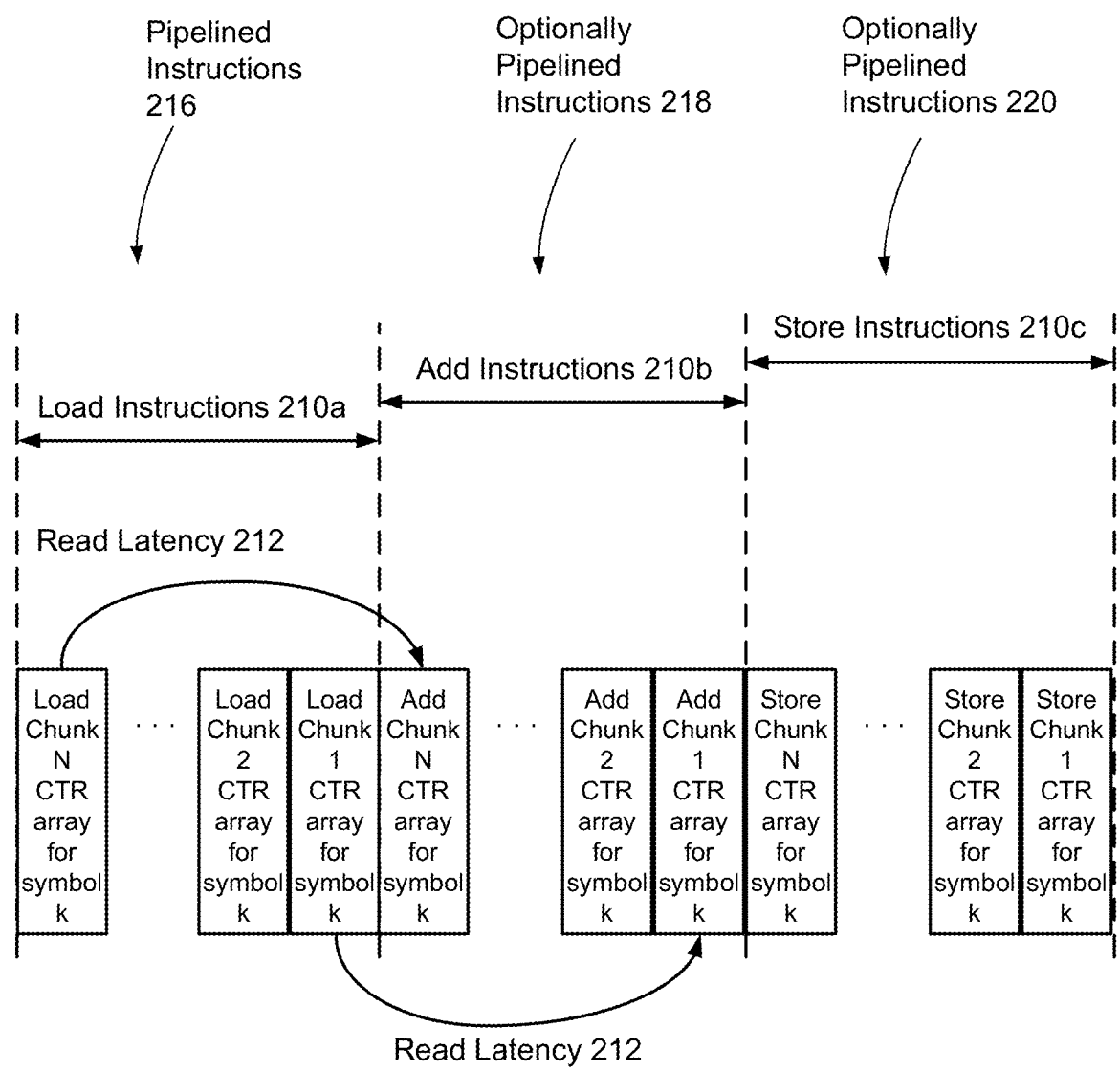
FIG. 2 is an illustration of pipelined instructions according to embodiments of the improved technique.

According to some examples, the entropy generator 150 experiences latency when loading data elements 146 from cache 140. The latency arises with regard to the computed entropy counters in CTR array 148 because access to the CTR array 148 is byte-value-driven and random, causing the read-modify-write operations to involve random access. The latency may be measured as a number of instruction cycles (clock cycles) of CPU 124a. For example, if the latency is 8 ns and CPU 124a has a cycle time of 1 ns, then the latency in accessing cache 140 is 8 cycles. Advantageously, the technique avoids waiting for the cache 140 by pipelining the processor instructions, as illustrated in FIG. 2 to follow. In some examples, the technique creates a set of "N" registers 126 for each of "N" chunks 144 of a page, where N is at least as large as the number of cycles of latency.

In some examples, data entropy calculations involve a series of processor instructions, as illustrated in FIG. 2. In some examples, the processor instructions described in reference to FIG. 2 may be performed by the CPU 124a.

FIG. 2 shows an example sequence of instructions executed by the single CPU 124a on a batch 128 of N chunks 144. As illustrated in FIG. 2, the instructions may include a set of N load instructions 210a, for loading data elements 146 from the CTR array 148, a set of N add instructions 210b, and a set of N store instructions 210c, where "N" is the number of chunks 144. In some examples, prior to the activity shown in FIG. 2, each of the N chunks 144 of the batch 128 (or some portion of each of the N chunks) is placed into memory 124a.

According to some examples, CPU 124a performs the set of N load instructions 210a from cache for N separate chunks 144 of the batch 128. In such examples, the CPU 124a may address each of the N load instructions to a respective region in cache 140 that is exclusive to the corresponding chunk 144. Therefore, instructions directed to one chunk do not conflict with instructions directed to other chunks. To further avoid contention, each of the data elements 146 processed in cache 140 may have a respective address location in the cache 140 that is not shared with any other of the data elements 146 in cache 140.

For each of the N load instructions 210a, a read latency 212 is incurred in reading from the cache 140. However, by setting the number of N load instructions 210a to be at least as great as the number of clock cycles of read latency 212 of the cache 140, each of the N load instructions 210a is performed without any need for the CPU 124a to remain idle while waiting for data to arrive from the cache 140. As a result, the CPU 124a is more fully utilized and overall throughput is improved. In a particular example, the cache 140 has a read latency of 8 clock cycles and N is chosen to be 8.

In some examples, the CPU 124a uses the value of symbol 142 (e.g., its binary ASCII value) as an index "k" into the CTR array 148. For 8 chunks and 256 symbol codes (e.g., ASCII codes), the CTR array 148 is established as an 8×256-element array.

FIG. 2 further illustrates a set of N add instructions 210b executed by CPU 124a. Each of the N add instructions 210b conditionally increments, by an increment value (e.g., 1), the corresponding data element 146 loaded by the corresponding load instruction 210a. Over the course of operation, the current data element 146 is incremented once for each occurrence of the respective symbol in the current chunk. Optionally, the CPU 124a may pipeline 218 the add instructions 210b, but this is not required.

As still further illustrated in FIG. 2, the CPU 124a may further execute a set of N store instructions 210c on the results of the N add instructions 210b. The N store instructions 210c may store each of the values resulting from the add operations 210b back into the CTR array 148. The N store instructions 210c are executed on the same data elements 146 in the CTR array 148 that were retrieved by the load instructions 210a and processed by the add instructions 210b, thus achieving a read-modify-write operation to cache 140. Optionally, the CPU 124a may pipeline 220 the store instructions 210c, but this is not required.

The N store instructions 210c are illustrated as being sequential in FIG. 2, but the sequences for the N store instructions 210c and can be varied. According to some examples, the N store instructions 210c can be performed in a single store instruction. In such examples, the single store instruction may be performed in one clock cycle, if supported by CPU 124a. According to some examples, the N store instructions 210c can be performed independently of the sequence of pipelined instructions 216.

Figure 3:
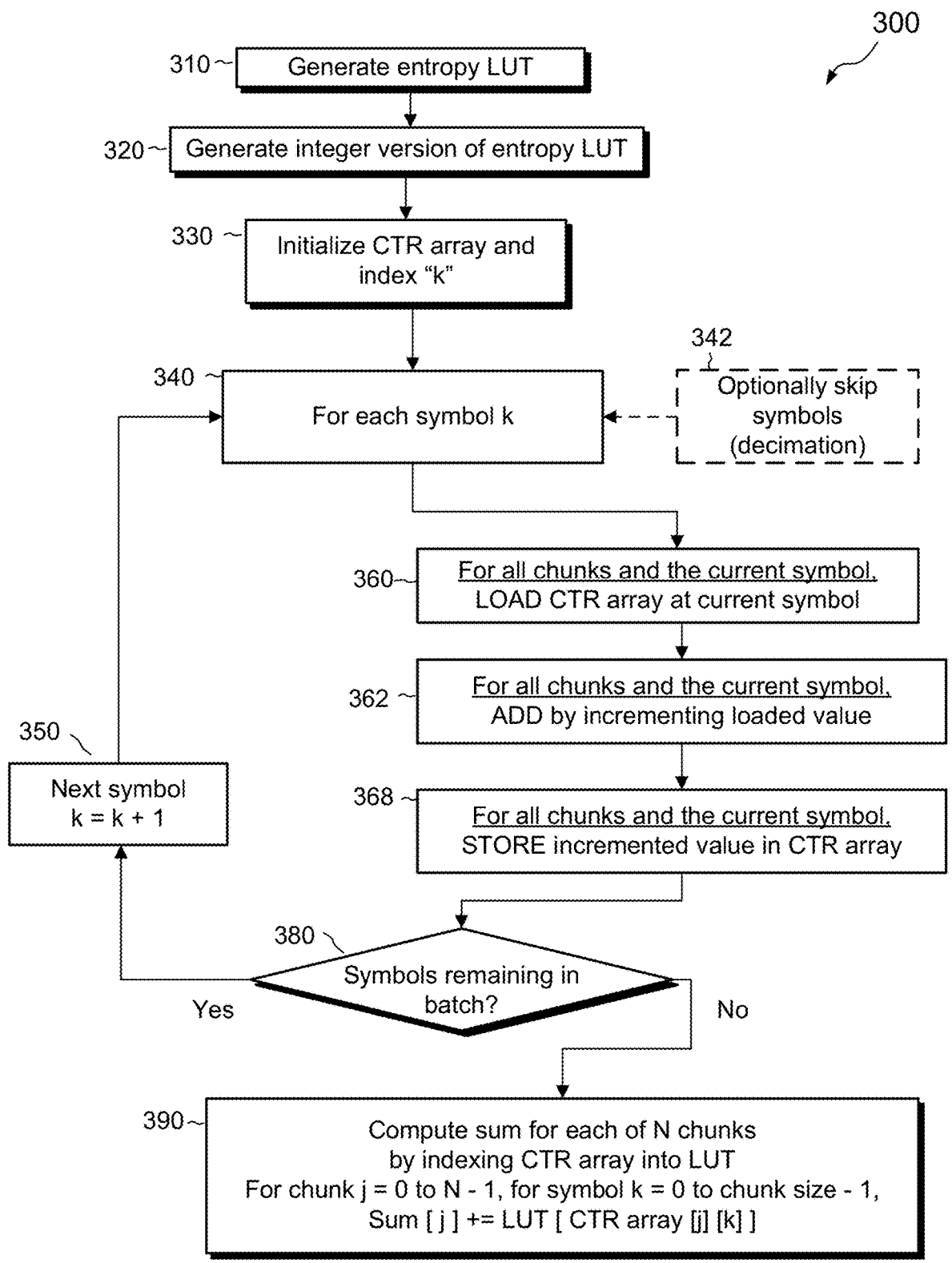
FIG. 3 is a flowchart of operation of an example method of entropy generation, according to embodiments of the improved technique.
Figure 4:
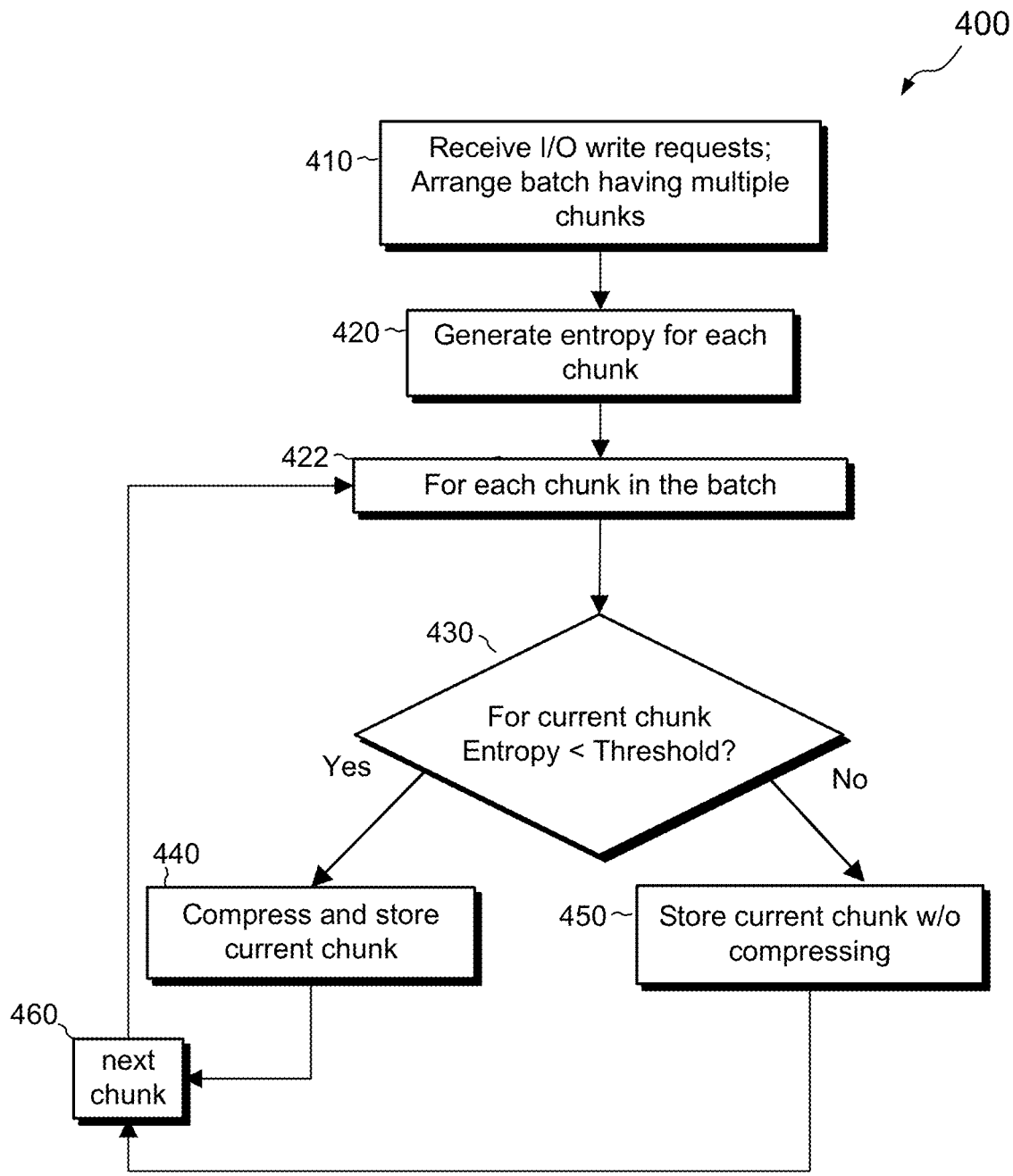
FIG. 4 is a flowchart of operation of an example method of managing data storage as it pertains to FIG. 3.
Figure 5:
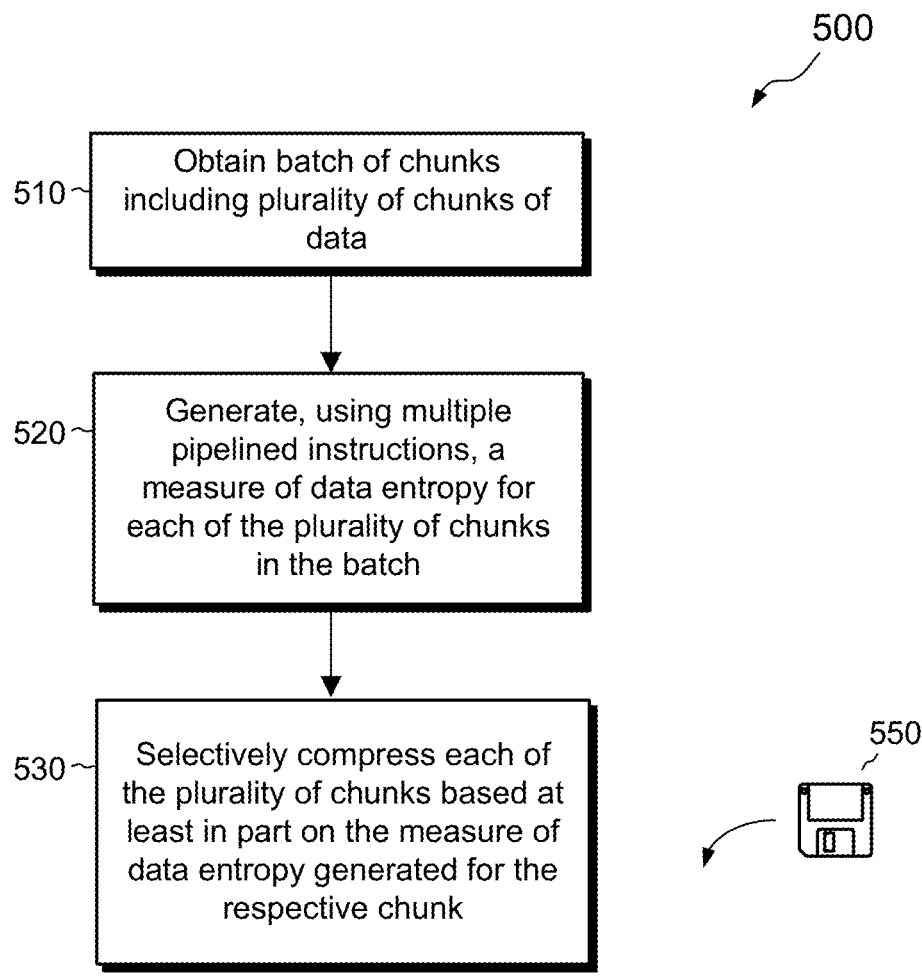
FIG. 5 is a flowchart showing an example method of managing data storage.

FIGS. 3-5 are example methods 300, 400, and 500 that may be carried out in connection with the environment 100. The methods 300, 400, and 500 are typically performed, for example, by the software constructs described in connection with FIG. 1, which reside in the memory 130 of the storage processor 120 and are run by CPU 124a (or multiple CPUs 124). The various acts of methods 300, 400, and 500 may be ordered in any suitable way. Accordingly, embodiments may be constructed in which acts are performed in orders different from that illustrated, which may include performing some acts simultaneously.

FIG. 3 is a flowchart of entropy generation 300, according to embodiments of the improved technique. In some examples, one or more of the steps of FIG. 3 are performed by the entropy generator 150.

At 310, in some examples, the SP 120 generates the entropy look-up table (LUT) 138. In some examples, the SP 120 generates the LUT 138 prior to run-time and/or prior to receiving chunks 144 on which entropy values are to be generated.

To generate the LUT 138, the SP 120 may calculate and store an entropy component 132 for each possible symbol count 130, e.g., from zero to the maximum number of symbols that may be found in a chunk. For example, if a symbol is represented by one byte and a chunk is 4 kB in length, then the LUT 138 may provide an entropy component 132 for each count from 0 to 4095.

In some examples, the SP 120 calculates each of the entropy components 132 of the LUT 138 as follows:

$$\text{For } [i = 0 \ldots ChunkSize - 1]$$
$$EntropyLookUpTable[i] = \frac{i}{ChunkSize} * \text{Log}_2\left(\frac{i}{ChunkSize}\right)$$

Here, "i" is the symbol count, e.g., the number of times the symbol in question appears in the current chunk, and ChunkSize is the maximum number of symbols in each chunk, e.g., 4096 in the example above.

At 320, in some examples, the SP 120 reduces computational overhead by providing entropy components 132 as integer values, rather than as more computationally expensive floating-point values. In an example, the SP 120 generates an integer version of each entropy component in the LUT 138 by scaling up the component (e.g., by multiplying by the ChunkSize) and rounding or truncating the value of each entropy component 132, e.g., using a "Floor" operation, as follows:
   For [i=0 . . . ChunkSize−1]
   ScaledEntropyLookUpTable[i]=EntropyLookUp
      Table[i]*ChunkSize
   IntegerEntropyLookUpTable[i]=Floor(ScaledChunkEn-
      tropyLookUpTable[i])

At 330, in some examples, the SP 120 initializes the CTR array 148, e.g., by setting all values to zero, and initializes the index "k" to zero.

At 340, in some examples, the SP 120 iterates over all symbols, e.g., all 256 ASCII symbols, using the index "k".

At 360, in some examples, the SP 120 loads (using instruction 210a) data elements 146 of the CTR array 148 for the current symbol. The load is performed in a pipelined manner across all chunks, e.g., all 8 chunks. In loading each data element 146, the SP 120 accesses the CTR array 148 using a chunk index "j" and the symbol index "k". The data element CTRArray[j][k]] retrieved by the load 210a represents the number of occurrences so far of the k-th symbol in the j-th chunk.

At 362, in some examples, for each of the N chunks 144 of the batch, the SP 120 then conditionally increments the values of the data elements 146 loaded during step 360 by performing add instructions 210b. An add instruction is performed only if a new occurrence of the k-th symbol in the j-th chunk has been found. Optionally, the add instructions 210b may be pipelined, but this is not required.

Notably, in some examples, for each of the N load instructions 210a of the CTR array 148, a read latency 212 is incurred in reading from cache 140. However, by setting the number of N load instructions 210a of the CTR array 148 to be at least as great as a number of clock cycles of latency of the cache 140, each of the N add instructions 210b may be performed without any clock cycle delays, so that any penalty associated with read latency 212 is avoided, for all but the first load.

At 368, in some examples, the SP 120 stores 210c each of the values of the data elements 146 incremented by the add instructions 210b, e.g., one for each chunk, back into the locations in the CTR array 148 from which the data elements 146 were loaded at 360. Optionally, the N store instructions 210c may be pipelined, but this is not required.

In some examples, each iteration of 360, 362, and 368 performs the operation below for N chunks "j" and the current symbol "k":
   For [j=0 . . . N−1]
   CTRArray[j][k]++.

In some examples, the operation "CTRArray[j][k]++" may correspond to a read-modify-write operation, in which step 360 performs a "read" (or load), step 362 performs a "modify" (or add), and step 368 performs a "write" (or store).

At 380, in some examples, if symbols remain in the batch 128, then the SP 120 proceeds at 350 to increment the symbol index "k," and then proceeds to 340 to process the next symbol 142, e.g., for all of the N chunks.

At 380, in some examples, if all symbols 142 have been processed in the batch 128, e.g., if the symbol index "k" equals the "ChunkSize−1," then the SP 120 proceeds to 390 to compute the sum 392 for each of the N chunks 144.

At 390, in some examples, the SP 120 iterates over all possible symbols k for each chunk 144 of the batch 128 and forms an entropy total 392 for each chunk 144. For example, SP 120 generates entropy totals as follows:
   For [j=0 . . . N−1]: For [k=0 . . . 255]
   entropy[j]+=IntegerEntropyLookUpTable
      [CTRArray[j][k]].

Here, CTRArray[j][k] is the count of occurrences 130 of the k-th symbol in the j-th chunk, as read from the CTR array 148. Each value CTRArray[j][k] provides a count index 130 into the LUT 138. Each lookup into the LUT 138 thus provides the corresponding entropy component 132. The entropy components are added as shown to generate the totals.

In some examples, the number of entropy components 132 in the LUT 138 equals the ChunkSize and each entropy total is the sum of up to ChunkSize values. We have recognized that the computation may be simplified, however.

As shown at step 342 of FIG. 3, the SP 120 reduces computational overhead by decimation, e.g., by skipping or excluding one or more symbols "k" from iterations of the loop at 340. According to some examples, in 342, the SP 120 selects only every other symbol, every fourth symbol, or the like, avoiding iterations of the loop 340 for every unselected symbol. One should appreciate that decimation also reduces the needed size of the CTR array 148, which would need to maintain fewer counts for a fewer number of symbols.

Additional features of the method 300 are now described with reference to the following pseudocode, which is provided for illustration only and is not intended to be limiting. For example, one or more steps of FIG. 3 may be performed in accordance with Example 1—Pseudocode to follow.

According to some examples, indices of Example 1—Pseudocode are defined as follows:
j=chunk index,
k=symbol index.

Example 1—Pseudocode

Pre-Calculate Table:

$$EntropyLookUpTable[i] = \frac{i}{BlockSize} * Log_2\left(\frac{i}{BlockSize}\right),$$

where "i" represents the count of a particular symbol in a particular block, e.g., the index 130 of LUT 138, and varies from 0 to BlockSize−1.
For optimization, we can convert the entropy table value to integers:
ScaledEntropyLookUpTable[i]=EntropyLookUp Table[i]*BlockSize;
IntegerEntropyLookUpTable[i]=Floor(ScaledEntropy-LookUpTable[i]).
Calculate frequency of occurrence of symbol i in chunk 0:
1. Load 8 different blocks into 64-bit register $$reg\_j_{64} = load\left(data\left[\frac{BlockSize}{8} * j\right]\right) \quad [j = 0 \ldots 7]$$

2. For next step we use cached 2d array
CTRArray[8][256]
This array is used to calculate the frequency of each byte in each block of data for each byte (where byte=k) in $reg_{j_{64}}$ [j=0 . . . 7]
CTRArray[j][byte]++
baseaddr=&CTRArray

| ld base addr + byte | ld baseaddr + 0 * 256 * 4 + byte_0 * 4 |
| nop | ld baseaddr + 1 * 256 * 4 + byte_1 * 4 |
| nop | ld baseaddr + 2 * 256 * 4 + byte_2 * 4 |
| nop | ld baseaddr + 3 * 256 * 4 + byte_3 * 4 |
| add | add k_0 |
| store | add k_1 |

Figure 6:
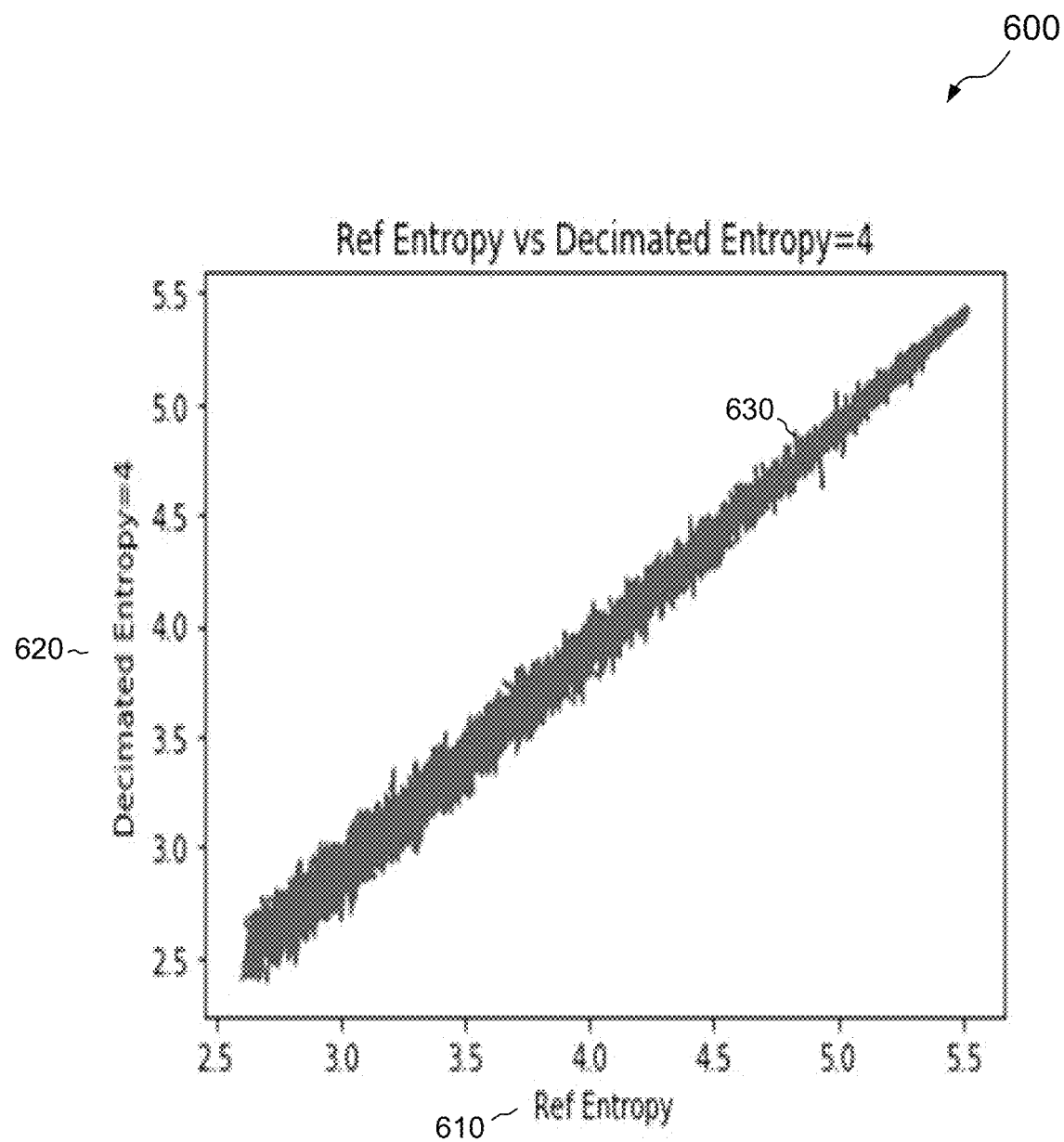
FIG. 6 is a graph showing example effects of decimation on entropy values.

3. Then we load next 64 bit form each block and repeat 1-2
4. Now we have full table of CTRArray for each byte and we can calculate our block entropy:
For j: 0-7
For k: 0-255
entropy[j]+=IntegerEntropyLookUpTable[CTRArray [j][k]]
Decimation:
5. For next step we use cached 2d array
CTRArray[8][256]
This array is used to calculate the frequency of each decimated byte in each block of data
for each decimated byte (where byte=k) in $reg_{j_{64}}$ [j=0 . . . 7]
CTRArray[j][byte]++
FIG. 4 shows the example method 400 of managing data storage.
At 410, the SP 120 receives IO requests 112, which specify writes of data to the data storage system 116. The data may be received in chunks 144, and the data storage system 116 arranges the chunks 144 into a batch 128 of N chunks.
At 420, the SP 120 generates entropy for each of the N chunks 144 of the batch 128, e.g., using the method 300 illustrated in FIG. 3.
At 422, the SP 120 iterates over each chunk 144 in the batch 128.
At 430, the SP 120 compares the generated entropy for the current chunk 144 to a threshold value. In some examples, the threshold value may be an integer value. If the generated entropy is below the threshold value, operation proceeds to 440, whereupon the SP 120 compresses and stores the current chunk 144. If, however, the generated entropy is above the threshold value, operation proceeds to 450, whereupon the SP 120 stores the current chunk 144 without compression.
At 460, if chunks remain in the batch 128, then the SP 120 proceeds to a further iteration of the loop at 422 for the next chunk.
FIG. 5 is a flowchart showing an example method 500 of managing data storage.
At 510, the method 500 obtains a batch 128 of chunks 144. The batch 128 may include a plurality of chunks 144 of data.
At 520, the method 500 generates, using multiple pipelined instructions 210a operating on the batch 128, a measure of data entropy for each of the plurality of chunks 144 in the batch 128.
At 530, he method 500 selectively compresses each of the plurality of chunks 144 based at least in part on the measure of data entropy generated for the respective chunk 144.
FIG. 6 is an illustration of example results 600 of performing decimation, e.g., as described in connection with FIG. 3. Reference entropy 610 (un-decimated) appears along the x-axis and decimated entropy (by a factor of 4) appears along the y-axis. The resulting relation 630 is seen to have a variance, which is visible as the thickness of the relation 630. As shown, the variance is higher for low values of reference entropy 610 and much lower for high values of reference entropy 610. Given that high values of entropy are of most use and/or interest in deciding whether to compress chunks 144, the results of FIG. 6 illustrate that decimation can be performed without substantial loss of accuracy.
Having described certain embodiments, numerous alternative embodiments or variations can be made. For example, although certain sizes of chunks 144 have been shown and described, these are merely examples, as the disclosure is not limited in this manner. Also, symbols 142 have been described as ASCII codes, but this is also merely an example. The same principles also apply for bytes of data and other types of symbols, and the symbols need not be text. Further, although entropy generation has been shown and described in connection with determining whether to attempt compression on a chunk of data, there are many other useful applications, such as determining whether to attempt deduplication on a chunk of data. High-entropy chunks may be good candidates for deduplication, but they are generally poor good candidates for compression. Thus, a storage system may establish an entropy threshold, below which the system favors compression and above which the system favors deduplication. Yet another application is for identifying portions of data, such as sectors, that have the highest entropy in a chunk or block, and then using that highest-entropy portion of data as a representative for the overall chunk or block. For instance, a block-based deduplication scheme may select a highest-entropy sector within a block and perform sector-based hashing to identify full-block matches. This approach relies upon determining which sectors have high entropy, as only high-entropy sectors can effectively differentiate the blocks in which they are contained.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing data storage in a computerized system, the method comprising:
    obtaining a batch of chunks, the batch including a plurality of chunks of data;
    generating, using multiple pipelined instructions operating on the batch, a measure of data entropy for each of the plurality of chunks in the batch; and
    selectively compressing chunks of the plurality of chunks based at least in part on the measures of data entropy generated for the respective chunks,
    wherein the multiple pipelined instructions include pipelined processor instructions of a single CPU (central processing unit), and wherein the pipelined processor instructions include N load instructions from a cache, wherein N is at least as large as a latency in accessing the cache by the CPU as measured in clock cycles of the CPU.

2. The method of claim 1, wherein the chunks within the batch are of equal size.

3. The method of claim 1, wherein pipelined instructions include load instructions for loading respective data elements from a cache, and wherein a number of the plurality of chunks is at least as great as a number of clock cycles required for the CPU to load each data element from the cache.

4. The method of claim 3, further comprising executing the load instructions sequentially during respective clock cycles of the CPU.

5. The method of claim 3, wherein the data elements represent counts of symbols occurring in the chunks.

6. The method of claim 5, wherein the data elements include a plurality of data elements for each chunk.

7. The method of claim 6, wherein the plurality of data elements for each chunk includes a data element for each symbol allowed to occur in the chunk.

8. The method of claim 3, wherein each of the data elements has a respective address location in the cache which is not shared with any other of the data elements.

9. The method of claim 1, further comprising providing a look up table (LUT) that associates (i) counts of symbol occurrences with (ii) entropy components corresponding to the respective counts.

10. The method of claim 9, wherein the entropy components in the LUT are integer values.

11. The method of claim 10, wherein generating the measure of data entropy for a chunk includes (i) obtaining a set of entropy components from the LUT based on counts of symbols appearing in the chunk and (ii) generating a sum of the obtained entropy components.

12. The method of claim 11, wherein generating the sum of entropy components includes adding entropy components across all unique symbols in the chunk.

13. The method of claim 11, wherein generating the sum of entropy components includes adding entropy components across fewer than all unique symbols in the chunk.

14. The method of claim 13, wherein the symbols have a numerical sequence, and wherein adding entropy components across fewer than all unique symbols in the chunk includes adding entropy components from every Nth symbol in the sequence, where N is an integer greater than one, and excluding from the sum other symbols in the sequence.

15. A computerized system, comprising control circuitry that includes a set of processing units coupled to memory, the control circuitry constructed and arranged to:
    obtain a batch of chunks, the batch including a plurality of chunks of data;
    generate, using multiple pipelined instructions operating on the batch, a measure of data entropy for each of the plurality of chunks in the batch; and
    selectively compress chunks of the plurality of chunks based at least in part on the measures of data entropy generated for the respective chunks,
    wherein the multiple pipelined instructions include pipelined processor instructions of a single CPU (central processing unit), and wherein the pipelined processor instructions include N load instructions from a cache, wherein N is at least as large as a latency in accessing the cache by the CPU as measured in clock cycles of the CPU.

16. The system of claim 15, wherein the chunks within the batch are of equal size.

17. A computer program product including a set of non-transitory, computer-readable media having instructions which, when executed by control circuitry of a computerized system, cause the control circuitry to perform a method of managing data storage, the method comprising:
  obtaining a batch of chunks, the batch including a plurality of chunks of data;
  generating, using multiple pipelined instructions operating on the batch, a measure of data entropy for each of the plurality of chunks in the batch; and
  selectively compressing chunks of the plurality of chunks based at least in part on the measures of data entropy generated for the respective chunks,
  wherein the multiple pipelined instructions include pipelined processor instructions of a single CPU (central processing unit), and wherein the pipelined processor instructions include N load instructions from a cache, wherein N is at least as large as a latency in accessing the cache by the CPU as measured in clock cycles of the CPU.

18. The method of claim 1, wherein the CPU avoids inactivity while waiting for results of a first load instruction to arrive from the cache by performing successive load instructions of the pipelined instructions.

19. The computerized system of claim 15, wherein the CPU avoids inactivity while waiting for results of a first load instruction to arrive from the cache by performing successive load instructions of the pipelined instructions.

20. The computerized system of claim 15, wherein the control circuitry is further constructed and arranged to provide a look up table (LUT) that associates (i) counts of symbol occurrences with (ii) entropy components corresponding to the respective counts.

21. The computer program product of claim 17, wherein the CPU avoids inactivity while waiting for results of a first load instruction to arrive from the cache by performing successive load instructions of the pipelined instructions.

22. The computer program product of claim 17, wherein the method further comprises providing a look up table (LUT) that associates (i) counts of symbol occurrences with (ii) entropy components corresponding to the respective counts.

* * * * *